US006802774B1

(12) United States Patent
Carlson et al.

(10) Patent No.: US 6,802,774 B1
(45) Date of Patent: Oct. 12, 2004

(54) VIDEO GAMING MACHINE HAVING FIRST AND SECOND CHANCE MEANS DISPLAYED ON A VIDEO MONITOR WITH SEQUENCING MEANS

(75) Inventors: Rex R. Carlson, Las Vegas, NV (US); Rich Schneider, Las Vegas, NV (US); Scott Boyd, Las Vegas, NV (US); Miles Patceg, Las Vegas, NV (US)

(73) Assignee: Casino Data Systems Inc., Las Vegas, NV (US)

(*) Notice: Subject to any disclaimer, the term of this patent is extended or adjusted under 35 U.S.C. 154(b) by 557 days.

(21) Appl. No.: 08/821,978

(22) Filed: Mar. 20, 1997

(51) Int. Cl.[7] .................................................. A63F 13/00
(52) U.S. Cl. .............................. 463/16; 463/13; 463/25
(58) Field of Search ........................... 463/9–13, 16–22, 463/25–28, 30; 273/292, 274, 138.1, 139, 138.2, 309, 85 R, 142 R, 141 R

(56) References Cited

U.S. PATENT DOCUMENTS

| | | | | | |
|---|---|---|---|---|---|
| 2,171,295 | A | * | 8/1939 | Shultz | 273/143 R |
| 4,624,459 | A | | 11/1986 | Kaufman | |
| 4,743,022 | A | * | 5/1988 | Wood | 273/85 |
| 4,836,546 | A | * | 6/1989 | DiRe et al. | 273/143 R |
| 4,871,171 | A | | 10/1989 | Rivero | |
| 5,042,818 | A | * | 8/1991 | Weingardt | 273/292 |
| 5,224,706 | A | * | 7/1993 | Bridgeman | 463/13 |
| 5,294,120 | A | * | 3/1994 | Schultz | 463/13 |
| 5,318,298 | A | | 6/1994 | Kelly et al. | |
| 5,342,047 | A | * | 8/1994 | Heidel et al. | 463/13 |
| 5,342,049 | A | | 8/1994 | Wichinsky et al. | |
| 5,344,145 | A | * | 9/1994 | Chadwick et al. | 273/138 A |
| 5,393,057 | A | | 2/1995 | Marnell, II | |
| 5,397,125 | A | | 3/1995 | Adams | |
| 5,409,225 | A | | 4/1995 | Kelly et al. | |
| 5,531,440 | A | * | 7/1996 | Dabrowski et al. | 463/12 |
| 5,560,603 | A | | 10/1996 | Seelig et al. | |
| 5,603,659 | A | * | 2/1997 | Okada | 463/16 |
| 5,628,684 | A | * | 5/1997 | Bouedec | 463/17 |
| 5,632,485 | A | * | 5/1997 | Woodland et al. | 463/12 |
| 5,664,999 | A | * | 9/1997 | Kurihara | 463/20 |
| 5,722,891 | A | * | 3/1998 | Inoue | 463/20 |
| 5,772,509 | A | * | 6/1998 | Weiss | 463/16 |
| 5,785,593 | A | * | 7/1998 | Wood et al. | 463/13 |
| 5,816,918 | A | * | 10/1998 | Kelly et al. | 463/16 |
| 5,833,537 | A | * | 11/1998 | Barrie | 463/21 |
| 5,868,618 | A | * | 2/1999 | Netley et al. | 463/13 |

FOREIGN PATENT DOCUMENTS

| | | |
|---|---|---|
| DE | 3630714 | 5/1988 |
| DE | 3801643 | 7/1989 |
| EP | 0558307 | 9/1993 |
| GB | 2072395 | 9/1981 |
| GB | 2083936 | 3/1982 |
| GB | 2106293 | 4/1983 |
| GB | 2137392 | 10/1984 |
| GB | 2153572 | 8/1985 |
| GB | 2170636 | 8/1986 |
| GB | 2181589 | 4/1987 |
| GB | 2191030 | 12/1987 |
| GB | 2197974 | 6/1988 |
| GB | 2202984 | 10/1988 |
| GB | 2222712 | 3/1990 |
| GB | 2226907 | 7/1990 |
| GB | 2230373 | 10/1990 |
| GB | 2273384 | 6/1994 |
| JP | 5131044 | 5/1993 |

* cited by examiner

*Primary Examiner*—John M. Hotaling, II
(74) *Attorney, Agent, or Firm*—Bernhard Kreten & Assoc.

(57) ABSTRACT

A video gaming device in which a first game having a first award structure is influenced by a second game having an award structure enhancement operatively coupled to the first game all of which are integrally found on a video display monitor.

14 Claims, 9 Drawing Sheets

Sample Pay Table

| Poker Hand | Award/Coin-In (1-4) | Award/Coin-In (5) |
|---|---|---|
| Royal Flush | 250 | 800 |
| Straight Flush | 50 | 50 |
| Four of a Kind + Wilds | 250 | 800 |
| Four of a Kind + Red Sevens | 160 | 160 |
| Four of a Kind + Mixed Sevens | 80 | 80 |
| Four of a Kind | 50 | 50 |
| Full House | 10 | 10 |
| Flush | 7 | 7 |
| Straight | 5 | 5 |
| Three of a Kind | 3 | 3 |
| Two Pair | 1 | 1 |
| Jacks or Better | 1 | 1 |
| All Others | 0 | 0 |

Figure 9

VIDEO GAMING MACHINE HAVING FIRST AND SECOND CHANCE MEANS DISPLAYED ON A VIDEO MONITOR WITH SEQUENCING MEANS

FIELD OF THE INVENTION

The following invention is directed generally to a gaming machine which accept wagers from a player. More particularly, the instant invention is directed to a video gaming machine in which a second chance means displayed on the video monitor concomitantly along with a first chance means has a potential effect on an outcome and award for the player.

BACKGROUND OF THE INVENTION

The quest for games which will provide greater interest among players who wager is an ongoing odyssey. It is highly desirable to allow players the opportunity to exercise skill and judgment as a correlative of the gaming experience, and at the same time it is also highly desirable to meet the player's expectations in the ongoing pursuit of games which provide both greater stimulus and reward for their play.

Players enjoy the added benefits that inure from playing machines having extraordinary payouts, such as is evidenced in a progressive type machine wherein a first "more modest" award is potentially available after achieving any of a plurality of results on the game itself and a second award, a "super prize" is available for having obtained a very difficult hand (e.g. a royal flush). However, after a progressive has built up to a high level and has been awarded to a player, there is a drop off in participation in the progressive until the pool of money builds back up. It would be highly desirable for a casino to have a game in which the player is stimulated to continue playing irrespective of the rise and fall of the progressive award.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

U.S. Pat. DOCUMENTS

| U.S. Pat. No. | ISSUE DATE | INVENTOR |
|---|---|---|
| 4,624,459 | Nov. 25, 1986 | Kaufman |
| 4,871,171 | Oct. 3, 1989 | Rivero |
| 5,318,298 | June 7, 1994 | Kelly, et al. |
| 5,342,049 | Aug. 30, 1994 | Wichinsky, et al. |
| 5,393,057 | Feb. 28, 1995 | Marnell, II |
| 5,397,125 | Mar. 14, 1995 | Adams |
| 5,409,225 | Apr. 25, 1995 | Kelly, et al. |
| 5,560,603 | Oct. 1, 1996 | Seelig, et al. |

FOREIGN PATENT DOCUMENTS

| Pat. No. | ISSUE DATE | INVENTOR |
|---|---|---|
| GB 2 072 395 A | Sep. 30, 1981 | Kennedy |
| GB 2 083 936 A | Mar. 31, 1982 | Hurst, et al. |
| GB 2 106 293 A | Apr. 7, 1983 | Last |
| GB 2 137 392 A | Oct. 3, 1984 | Pressland, et al. |
| GB 2 153 572 A | Aug. 21, 1985 | Thomas |
| GB 2 170 636 A | Aug. 6, 1986 | Foster, et al. |
| GB 2 181 589 A | Apr. 23, 1987 | Wain |
| GB 2 191 030 A | Dec. 2, 1987 | Melen, et al. |
| DE 3630 714 A | May 11, 1988 | Gauselmann |
| GB 2 197 974 A | June 2, 1988 | Evans |
| GB 2 202 984 A | Oct. 5, 1988 | Rivero |
| DE 3801 643 A | July 27, 1989 | Apparatebau |
| GB 2 222 712 A | Mar. 14, 1990 | Wain |
| GB 2 226 907 A | July 11, 1990 | Farrell, et al. |
| GB 2 230 373 A | Oct. 17, 1990 | Lee |
| JP 5-131044 (A) | May 28, 1993 | Miyasaka |
| EP 558 307 A2 | September 1993 | Thomas |
| GB 2 273 384 A | June 15, 1994 | Crossman, et al. |

The present invention diverges starkly from these citations as set forth herein.

SUMMARY OF THE INVENTION

The instant invention is distinguished from the known prior art in a multiplicity of ways. One element of distinction involves the provision of a first game and a second game displayed on one video monitor. One advantage of such a display allows any game updates to the first and second games to occur with relatively little effort, since the modifications can be effected using software. This also means that the first and second games are not as susceptible to maintenance requirements or tampering. A single monitor also allows the player to remain focused since the first and second games are on the same viewing field unlike the prior art which requires the player's attention to be diverted from one area to another area. By having both games within a comfortable field of vision, the player is less likely to be distracted and omit a strategy especially when the second game is in a field of vision removed from the areas of principle focus by the player, as in the prior art.

Preferably the first game simulates conventional draw poker using a conventional deck of fifty-two cards to be dealt at random. The second game may be viewed as an enhancement to the first game providing an enrichment awarded the player on the first game. Alternatively, the second game may also be one which can alter the play strategy adopted by the player to maximize benefit to the player of the first game during the course of play. In addition, the second game may also provide an opportunity for the player to exercise judgment independent of the first game for achieving a beneficial outcome directly in the second game through player judgment.

In a preferred embodiment, the first game comprises a draw poker game in which a player is to receive initially five cards face up drawn at random from a deck of fifty-two. The second game may be the video embodiment of a reel type of slot machine with three reels to enhance the player's award. The second game may be in the form of a pair of dice that are to be "cast" (by simulation) to potentially benefit the player's payout. The second game may comprise a wheel with a plurality of numbers that rotate around the periphery which when cause to stop rotating signifies an enhancement to the player's award. The second game can be in a form to display other playing cards or perhaps a joker which could be used in improving the poker hand of the player in the underlying poker game. The second game can have an independent goal (e.g. approach a number, play blackjack ("21") etc.) Since these "card-type" options for the second game are not extracted from the conventional deck of playing cards used to play draw poker, their presence will not alter the poker game's probabilities; it only affects payout.

OBJECTS OF THE INVENTION

Accordingly, it is a primary object of the present invention to provide a new and novel wagering device.

A further object of the present invention is to provide a device as characterized above and a method of play therefore.

A further object of the present invention is to provide a device as characterized above and method which stimulates the player and makes possible the award of a greater prize than would normally have been available in a single game.

A further object of the present invention is to provide a device and method as set forth above in which the player patronage of the game per se is not affected by a progressive jackpot which waxes and wanes based on activity by third party players.

A further object of the present invention is to provide a device and method as characterized above in which the outcome of the play is determined by first and second games disposed on a single video display terminal well within the view and comfortable field of vision of the player.

A further object of the present invention is to provide a device and method as set forth above in which updates to the game can be made efficiently through software.

Viewed from a first vantage point, it is an object of the present invention to provide a gaming machine comprising, in combination, a housing, a video monitor disposed in the housing visually accessible to a player, wagering means operatively coupled to the video monitor to enable the monitor to display wagering stimulus to the player, the wagering stimulus including first and second chance means displayed on the video monitor including means to enable the second chance means to potentially effect an outcome attained via the first chance means.

Viewed from a second vantage point, it is an object of the present invention to provide a method of playing a video gaming machine in which first and second chance means are displayed on a video monitor, the steps including making a wager, receiving a first game displayed on the video monitor, executing a strategy for the first game, receiving a second game displayed on the video monitor, and evaluating whether an award is due based on the outcome derived from the first and second games.

Viewed from a third vantage point, it is an object of the present invention to provide a gaming machine method, the steps including: receiving a wager, displaying a first game, accepting a player strategy for playing the first game, displaying a second game, evaluating an outcome based on the first and second games outcome and granting any applicable award based on the outcome.

These and other objects will be made manifest when considering the following detailed specification when taken in conjunction with the appended drawing figures.

BRIEF DESCRIPTION OF THE DRAWINGS

FIG. 9 reflects an illustrative sample pay table.

DESCRIPTION OF PREFERRED EMBODIMENTS

Figure 6:
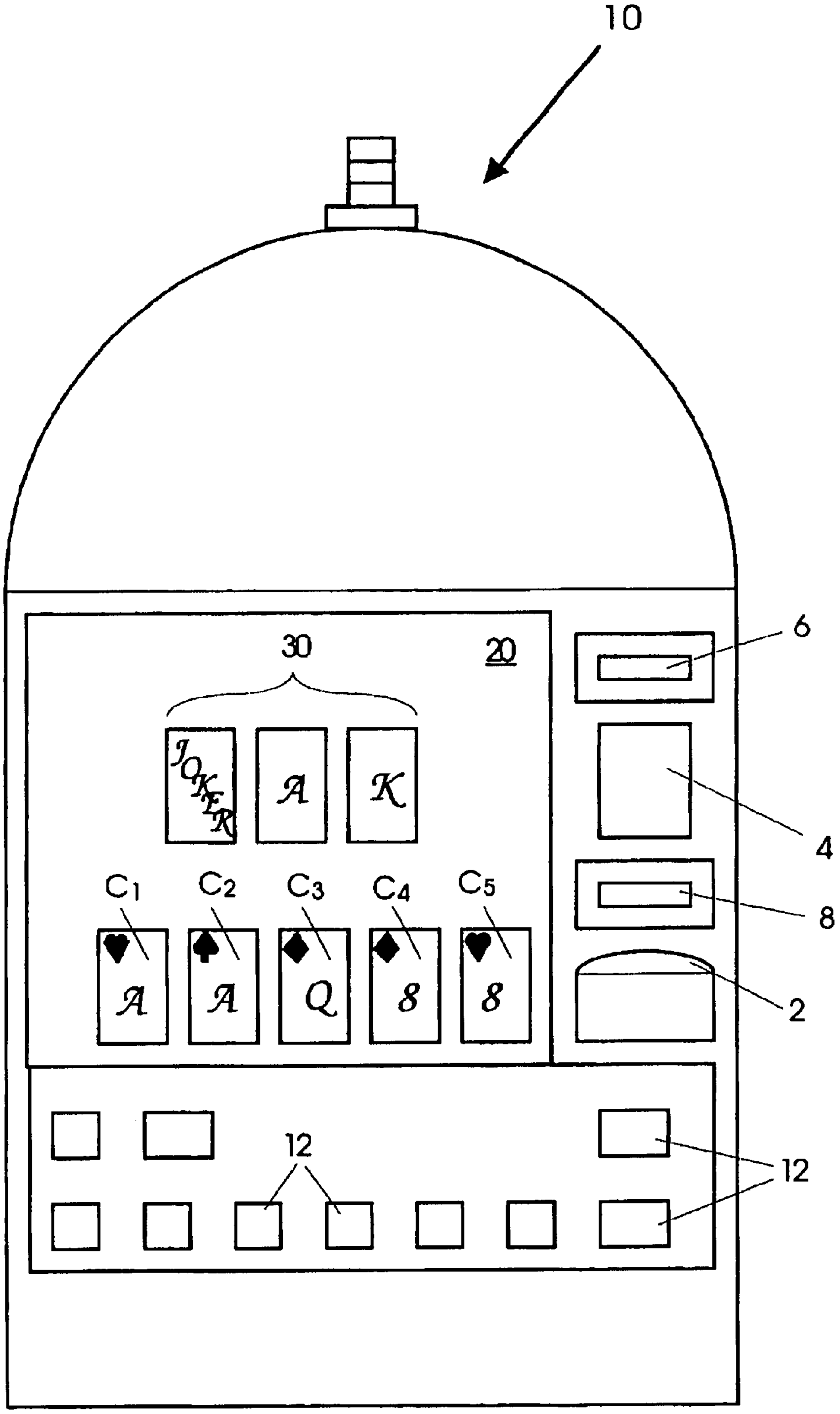
FIG. 6 is a visual depiction of a gaming machine having the video display of FIG. 5 thereon.

Considering the drawings, wherein like reference numerals denote like parts throughout the various drawing figures, reference numeral 10 is directed to the apparatus according to the present invention, shown in FIG. 6.

Figure 7:
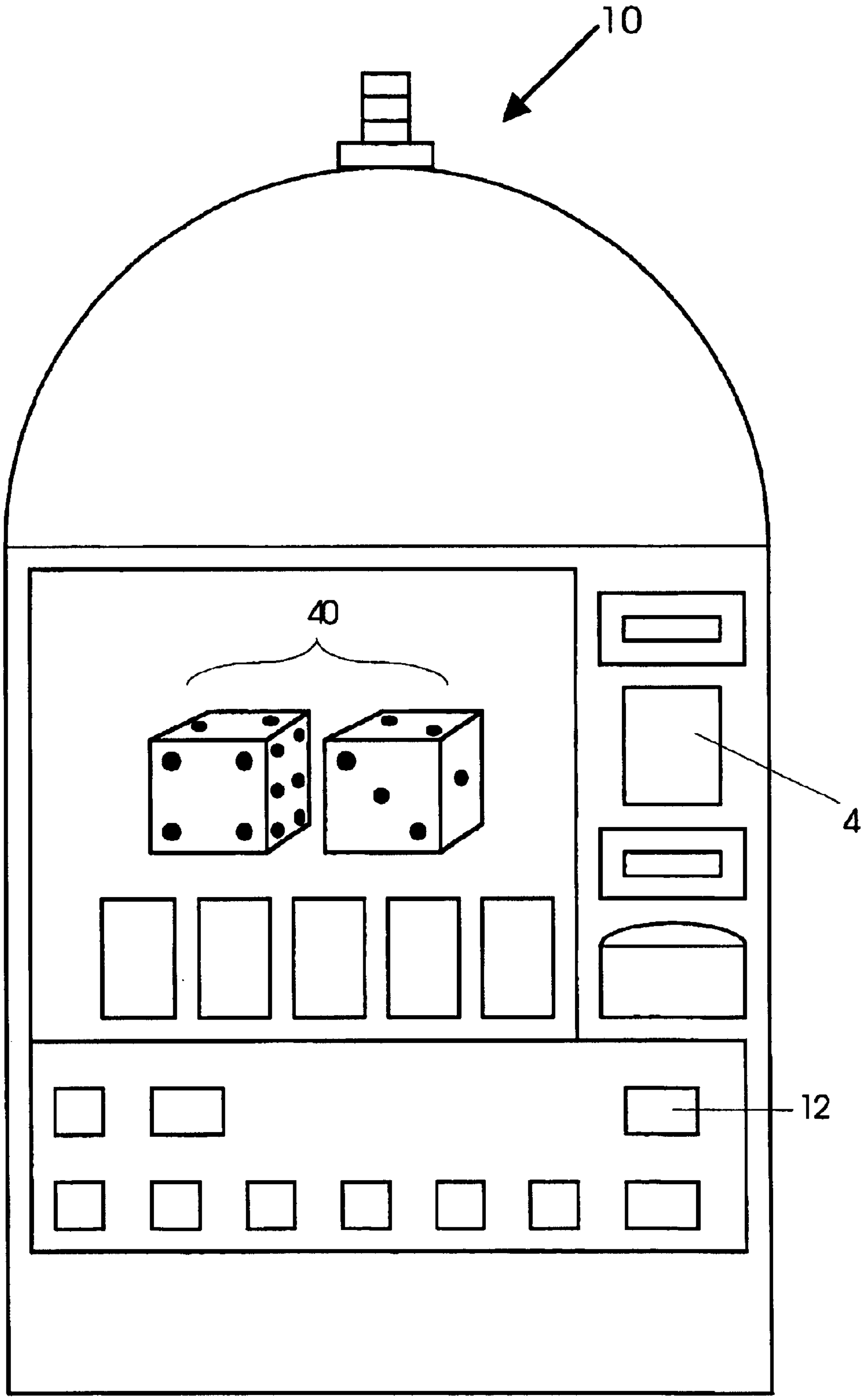
FIG. 7 is a visual depiction of a gaming machine having another video display of FIG. 5 thereon.
Figure 8:
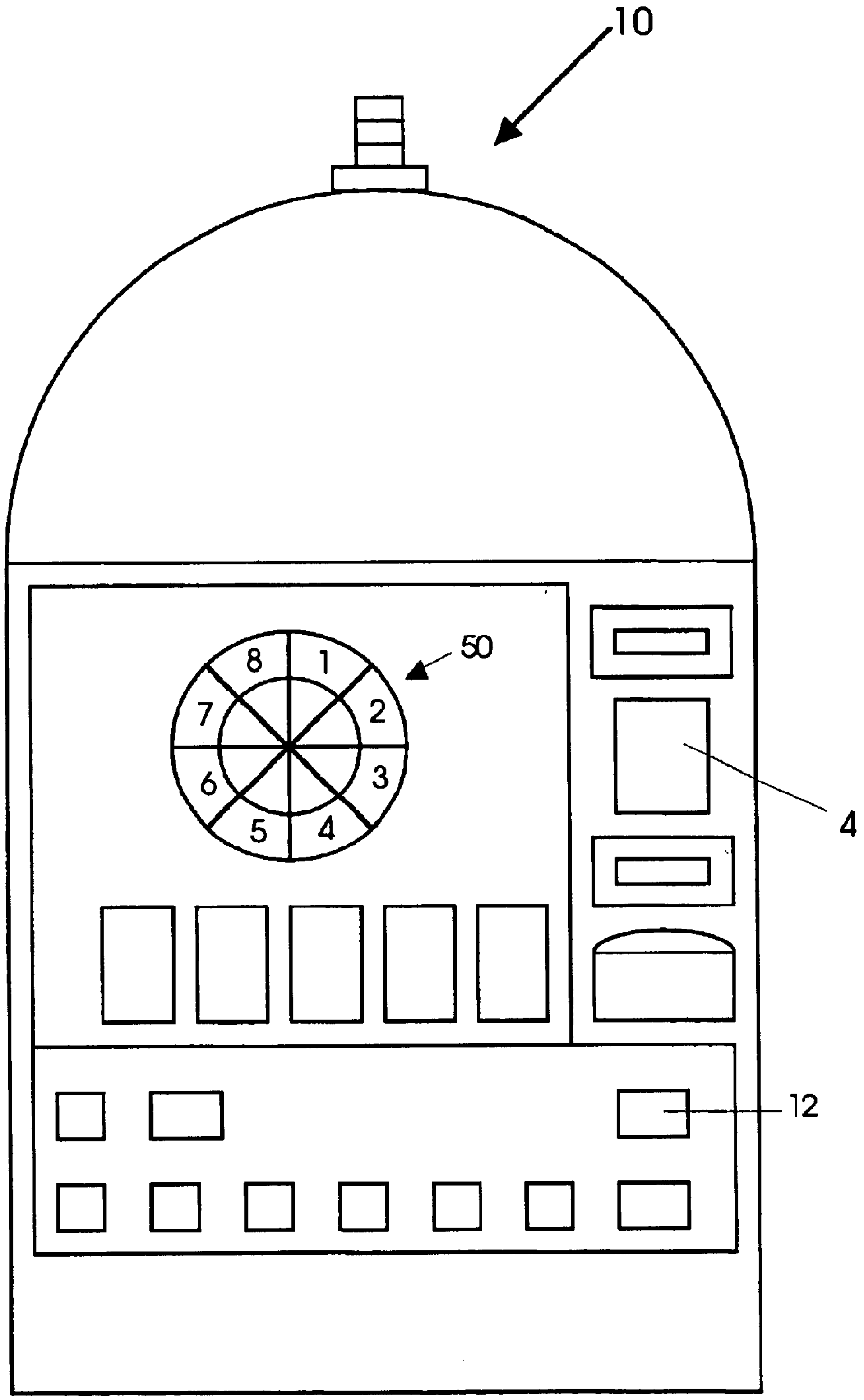
FIG. 8 is a visual depiction of a gaming machine having another video display of FIG. 5 thereon.

In its essence, the machine can include a coin slot 2, an alpha numeric pad 4, an LED display 6, a currency receiver slot 8, a video display screen 20 and a plurality of decision related push buttons 12. The game is initiated by the player establishing a credit on the machine via entering either tokens, coins, currency or the like and making a wager. The secondary game can automatically be enabled or in the alternative the secondary game can be enabled through an additional wager. Once the game has been initiated, five cards, $C_1$ through $C_5$ will be exhibited for the player to analyze with respect to the strategy of draw poker in which cards may be discarded in order to improve the hand. This first chance means, i.e. the draw poker hand, is complemented by a second chance means diagramatically depicted in FIG. 6 as three reels 30. Alternatively, a pair of dice 40 (FIG. 7) may be displayed or a wheel 50 (FIG. 8) having a plurality of stops around the outer periphery can be utilized in conjunction with the poker hand. All of these second chance means 30, 40 and 50 are displayed integrally on the video display monitor 20 as are the five draw poker cards.

Figure 1:
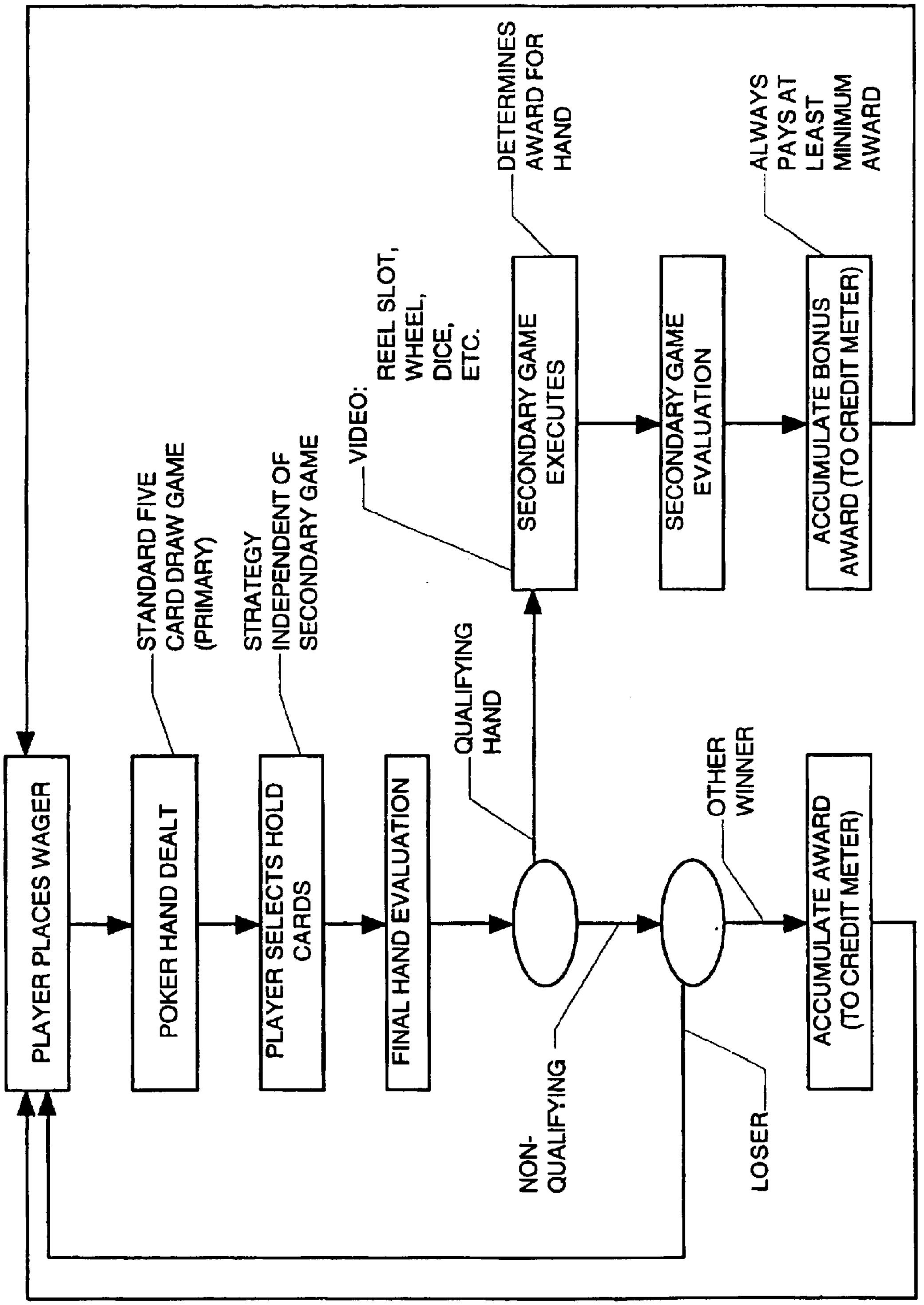
FIG. 1 is a flow chart of one game according to the present invention.

Referring to FIG. 1, one arrangement for playing a game according to the apparatus and method of the present invention can be explored. As shown in the FIG. 1 flow chart, the second chance means has no direct effect on the strategy that the player makes with respect to the poker hand. Instead, after the player places a wager, a poker hand is dealt which comprises five cards from a standard fifty-two card deck. The player next makes a selection of which cards to hold and which cards to discard for improvement. A series of new cards are then distributed to the player that replace those which had been discarded and a final hand evaluation will be made. If the final hand is of a certain quality to "qualify", the video monitor will now execute the secondary chance means or secondary game be it indicia bearing reels, a wheel or dice and a visual depiction is enabled on the video screen which is subsequently evaluated for determination of the magnitude of the bonus award which will be credited to the player's account. On the other hand, should the player's hand not achieve a status that qualifies him for the secondary game, a second analysis is still performed to determine whether or not the player wins or loses on his final hand. Should he be a loser, he is entitled to play the game again. If he qualifies as a winner, he accumulates additional credits for further play. Assume, for example, the threshold for qualification is four of a kind. Should the player achieve a final hand which meets or exceeds that grade, (e.g. straight flush or royal flush) the secondary game will execute. Thus, in the game according to FIG. 1, the player's strategy is substantially independent of the secondary game, but the player is still cognizant of the minimum threshold for qualifying.

Figure 2:
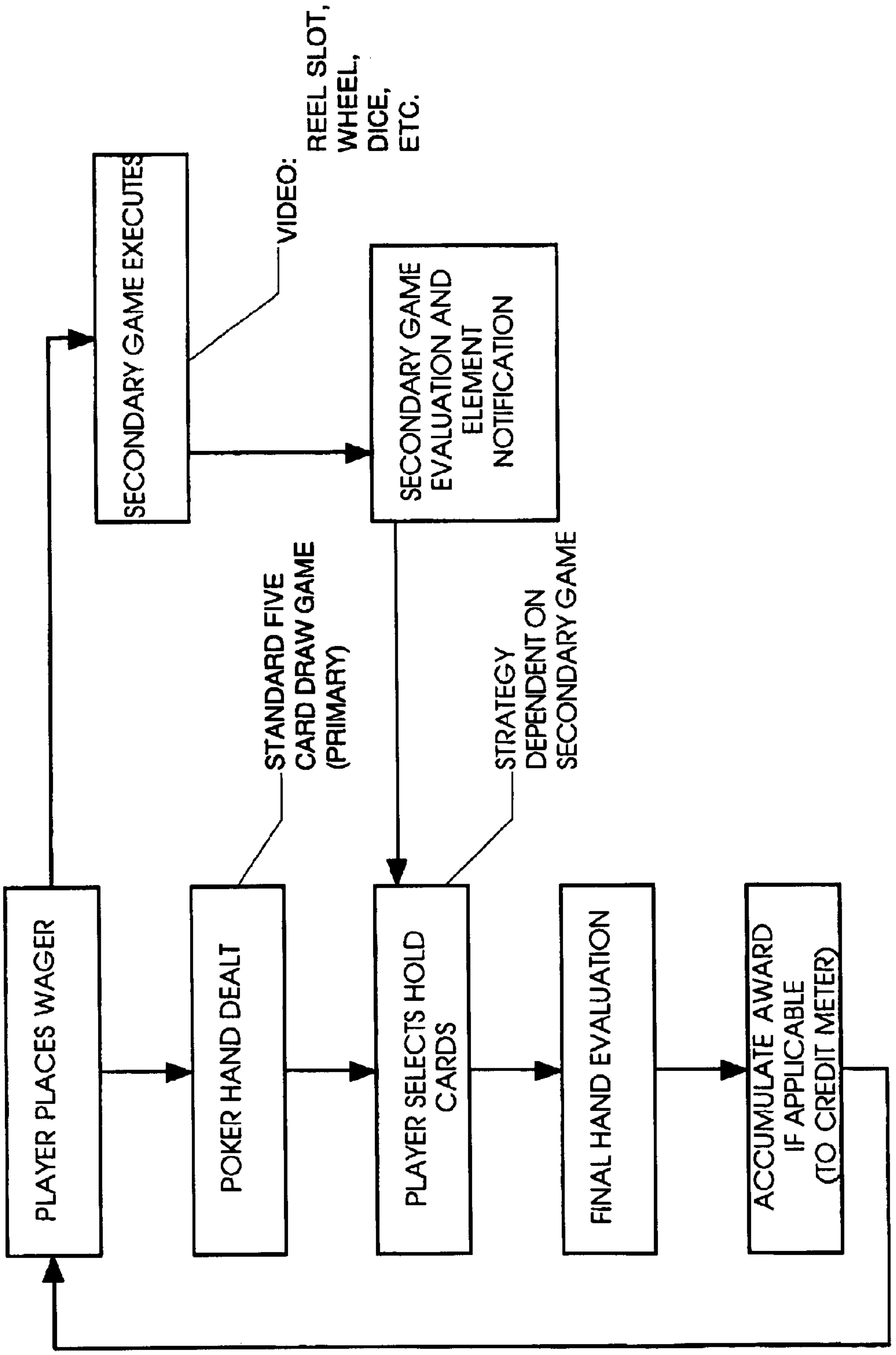
FIG. 2 is a flow chart of a second game according to the present invention.

Referring to FIG. 2, once the player makes a wager, both a poker hand is dealt and a secondary game is executed at the same time. Because the values displayed on the secondary game (e.g. values on a reel slot, wheel or dice, etc.) are visually discernible to the player, it can alter the player's strategy. Assume, for example, that the player is playing the reel game of FIG. 6 and a joker and an ace are displayed as shown on the reels in conjunction with the poker hand showing a pair of aces and a pair of eights. A player may alter one strategy of trying to earn a full house (by discarding only the queen) and instead discard not only the queen but also the pair of eights in an attempt to obtain both of the two remaining aces in the deck. In any event, once the player has selected which cards to hold and which to discard, a final hand evaluation is made and the decision as to whether or not the hand that has been finalized "qualifies" for an accumulated bonus is determined as before. This example allows an additional card such as the ace or a joker to alter the strategy of the player without actually affecting the probabilities of playing a poker hand with a conventional fifty-two card deck.

Figure 3:
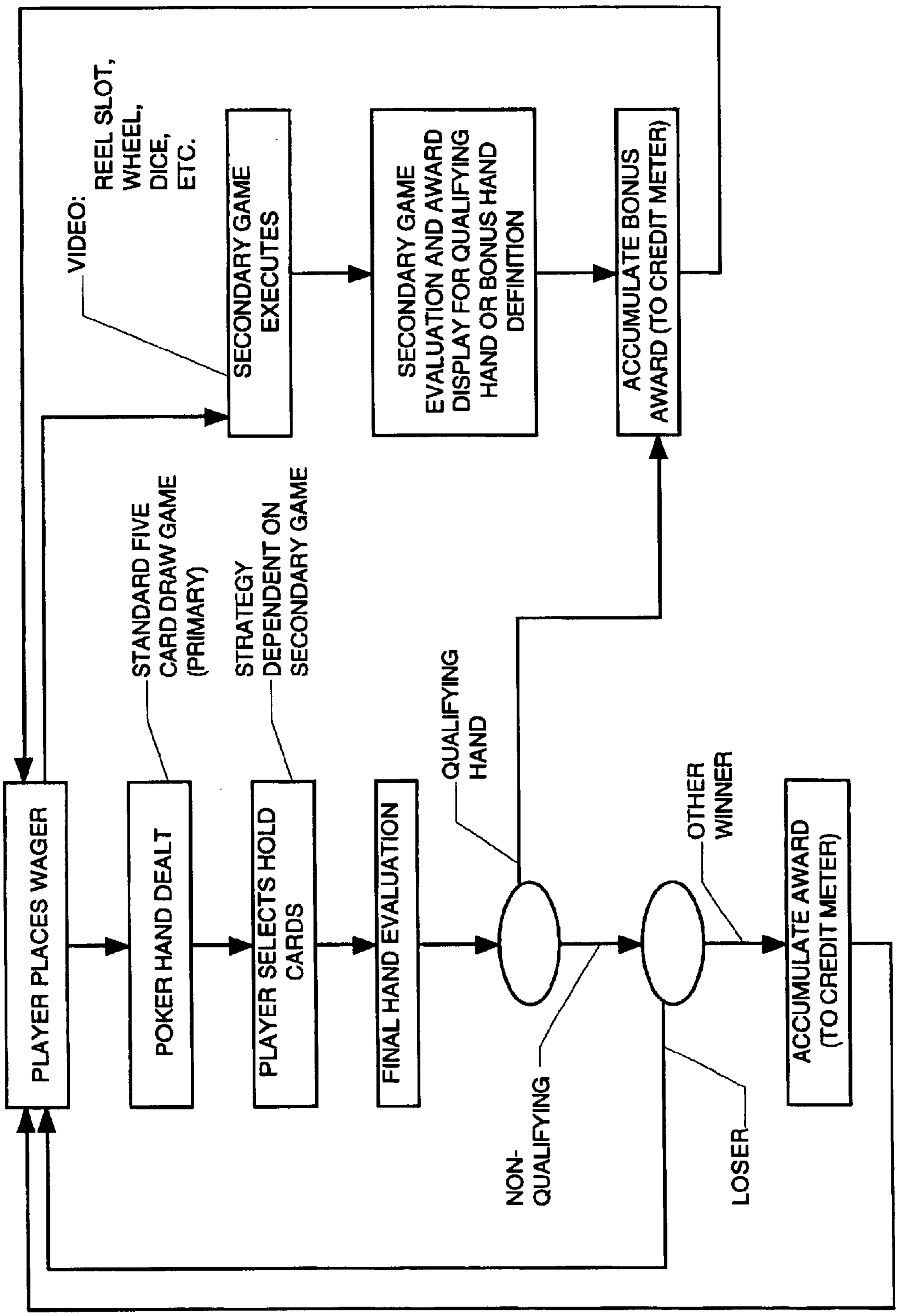
FIG. 3 is a flow chart of a third game according to the present invention.

With respect to FIG. 3, after the player places a wager, both the poker hand is dealt and the secondary game is executed so that the player can factor in the value of the secondary game in play on the poker hand. Thus, the secondary game allows the poker player to execute strategy based on a potential effect the outcome of the secondary game can have. In other words, the secondary game's primary influence is to alter the pay table. This may alter player strategy. This variation does not necessarily alter the value of the poker hand as in FIG. 2. After the player elects which cards to hold and discard, the final hand evaluation is made to determine a qualifying hand. The secondary game enables both a potential "stand alone" award and one which enhances the poker payout. For example three sevens on the reels 30 may have independent value or may modify the poker pay table or both. FIG. 9 illustrates a sample pay table which can alter strategy. As before the poker hand is also evaluated for "normal" winner/loser awards.

In other words that the secondary game may have an independent payout of its own. For example, assume that the three reels 30 of FIG. 6 displayed three sevens. It may occur that such an outcome has an independent value apart from the play that the poker player embraces with respect to the draw poker hand in chief. Please see the sample pay table (FIG. 9). Thus, a qualifying hand can benefit from an additional bonus based on the indicia on the secondary game and enhance the pay table at the same time.

Note (in FIG. 3) also that a "non-qualifying" hand is further sequestered into an outright loser or a hand in which the face value of the poker hand potentially accumulates credits for having won. A further variation involves allowing the player to respin one or more of the reels 30. This could be used to play "21" (blackjack) against a dealer's hand in message box 70 or other game. The message box can also inform the player of payouts that are possible.

Figure 4:
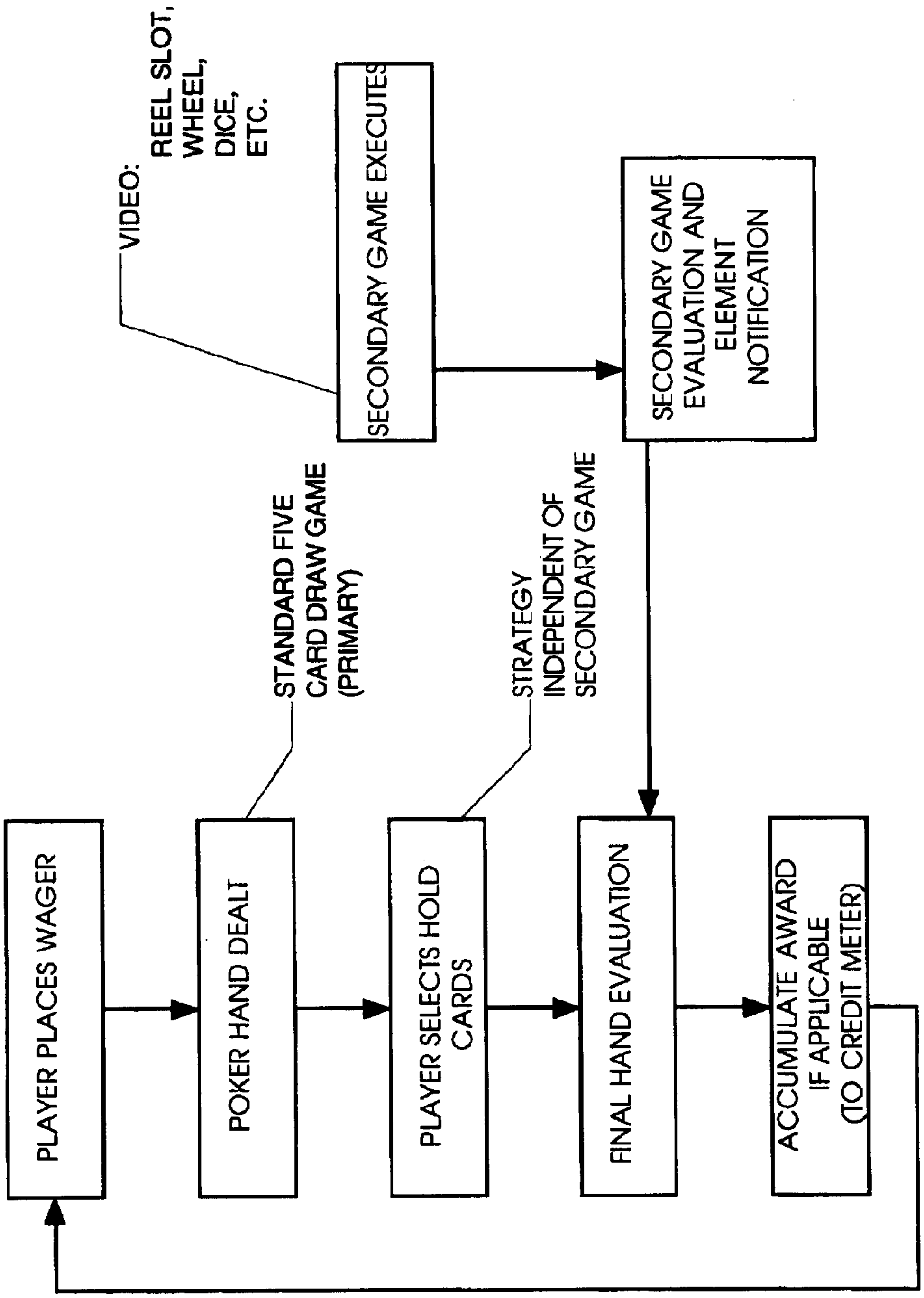
FIG. 4 is a flow chart of a fourth game according to the present invention.

FIG. 4 reflects another variation in which the secondary game is not executed until after the player has selected which cards to holds and which to discard. Thus, the poker player will be playing a conventional poker hand with strategy substantially unaffected by any stimulus from the secondary game until after the hand has been finalized for evaluation. The dice or wheel variation, for example, would enrich/determine a payout. Thus, the secondary game then superposes a second value in the award that is bestowed upon the poker player for which accumulation in the meter and to the player's credit has occurred.

Figure 5:
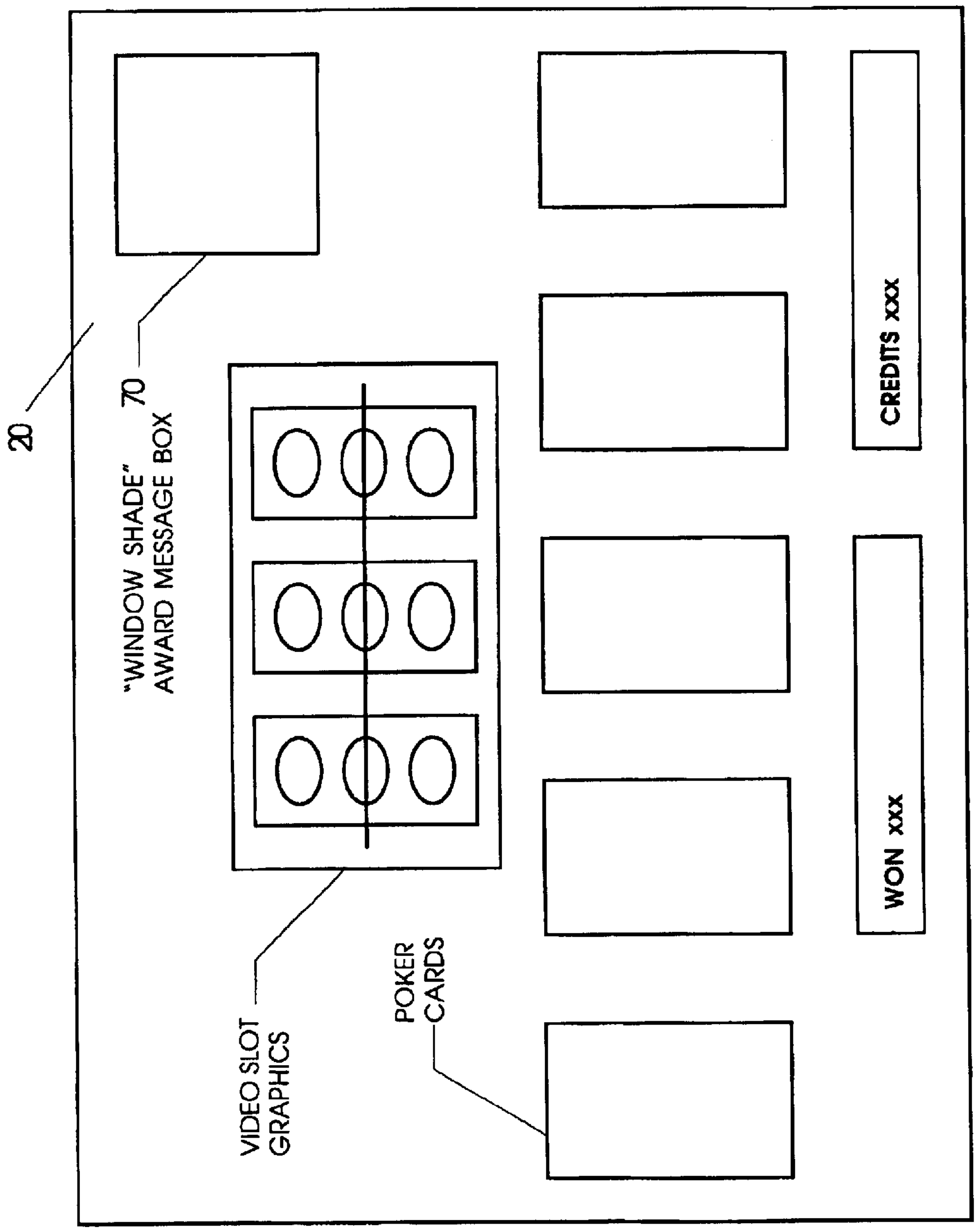
FIG. 5 is a visual depiction of the video display screen according to one form the present invention.

FIG. 5 reflects a reel-type device in which symbols, be they conventional bells, fruits, etc. from a reel-type slot machine are used in combination with poker cards as described hereinabove. In addition, a message box 70 appears in the upper right-hand corner of the video screen 20 that transmits information to the player with respect to benefits available to the player as a function of game outcome. A sample pay table in FIG. 9 illustrates how a conventional poker hand can be enhanced by virtue of the enhancing effect that the additional award can have. The pay table may appear in message box 70. All games are designed to be displayed on the video monitor 20 for ease in viewing. By having the game details on the video monitor 20, the player can focus on the games. The games are also easier to reprogram.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A gaming machine, comprising, in combination:

a housing, a video monitor in said housing and visually accessible to a player, wagering means operatively coupled to said video monitor to provide a first game having an initial outcome, means integral with said machine by which the player modifies said initial outcome to a final outcome, sequencing means for a second game, said second game appearing on said video monitor under control of said sequencing means to alter the time at which said second game appears, such that when said second game appears substantially contemporaneously with said initial outcome of said first game, said first and second games are interrelated and when said second game appears subsequent to said final outcome said first and second games are not interrelated.

2. A draw poker gaming machine, comprising, in combination:

a wager enabled video display, said wager enabled video display showing a draw poker game having an initial outcome of five cards from a conventional deck of fifty-two cards, sequencing means for an award modifying output, said award modifying output appearing on said video monitor under control of said sequencing means to alter the time at which said award modifying output appears, means for modifying said initial outcome to render a final poker hand, such that when said award modifying output appears substantially contemporaneously with said initial outcome of said draw poker game, said draw poker game and said award modifying output are interrelated and when said award modifying output appears subsequent to a final outcome of said draw poker game and said award modifying output and said draw poker game are not interrelated, comparison means to evaluate both said final hand and said award modifying output against a paytable to assess an award.

3. The machine of claim 2 wherein said award modifying output is embodied as playing cards independent of the conventional deck of fifty-two cards which combines with said final poker hand.

4. The machine of claim 2 wherein said award modifying output does not combine with said final hand but is recognized by a paytable which includes an intertwined series of awards including both poker outcomes and recognized outcomes possible from said award modifying output.

5. The machine of claim 2 wherein said award modifying output is configured as a plurality of reels.

6. The machine of claim 2 wherein said award modifying output is configured as a plurality of dice.

7. The machine of claim 2 wherein said award modifying output is configured as a bonus wheel.

8. The machine of claim 3 wherein said award modifying output is configured as a plurality of reels.

9. The machine of claim 3 wherein said award modifying output is configured as a plurality of dice.

10. The machine of claim 3 wherein said award modifying output is configured as a bonus wheel.

11. The machine of claim 4 including means to compare said final hand to a paytable and provide an award, if said final hand does not qualify to be combined with said award modifying output.

12. A gaming machine, comprising, in combination:

a wager enabled video display which produces a primary game embodied as a draw poker initial hand, means to improve said draw poker initial hand, resulting in a final hand, sequencing means for a secondary game, said secondary game appearing on said wager enabled video display under control of said sequencing means to alter the time at which said secondary game appears, such that when said secondary game appears substantially contemporaneously with an initial outcome of said primary game, said primary and secondary games are interrelated and when said secondary game appears subsequent to a final outcome of said primary game said secondary game and said primary game are not interrelated.

13. The gaming machine of claim 12 wherein said final hand is compared to a paytable for an award.

14. The gaming machine of claim 12 where said secondary game executes provided said final hand qualifies.

* * * * *